(12) United States Patent
Mizukami et al.

(10) Patent No.: US 10,107,309 B2
(45) Date of Patent: Oct. 23, 2018

(54) LOAD SENSING VALVE DEVICE

(71) Applicant: KYB Corporation, Tokyo (JP)

(72) Inventors: Shota Mizukami, Kanagawa (JP); Takeshi Terao, Kanagawa (JP); Akio Matsuura, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/522,284

(22) PCT Filed: Oct. 8, 2015

(86) PCT No.: PCT/JP2015/078667
§ 371 (c)(1),
(2) Date: Apr. 26, 2017

(87) PCT Pub. No.: WO2016/067887
PCT Pub. Date: May 6, 2016

(65) Prior Publication Data
US 2017/0314577 A1    Nov. 2, 2017

(30) Foreign Application Priority Data
Oct. 27, 2014    (JP) .................................. 2014-218498

(51) Int. Cl.
| | |
|---|---|
| *F16K 31/12* | (2006.01) |
| *F15B 11/16* | (2006.01) |
| *F15B 13/04* | (2006.01) |
| *F15B 13/06* | (2006.01) |
| *F16K 11/07* | (2006.01) |

(52) U.S. Cl.
CPC ........ *F15B 11/161* (2013.01); *F15B 13/0417* (2013.01); *F15B 13/06* (2013.01); *F16K 11/07* (2013.01); *F16K 31/12* (2013.01)

(58) Field of Classification Search
CPC ........ F15B 11/161; F15B 13/06; F16K 11/07; F16K 31/12
USPC .......... 137/596.17, 596.14; 91/355, 521, 525
See application file for complete search history.

(56) References Cited

U.S. PATENT DOCUMENTS

| | | | | |
|---|---|---|---|---|
| 6,408,876 | B1 * | 6/2002 | Nishimura | ............ F15B 11/165 |
| | | | | 137/596.14 |
| 9,309,901 | B2 * | 4/2016 | Ku | ........................ E02F 9/2267 |
| 9,689,500 | B2 * | 6/2017 | Coolidge | .............. F15B 11/042 |
| 9,719,609 | B2 * | 8/2017 | Terao | ...................... F16K 11/07 |
| 9,810,244 | B2 * | 11/2017 | Kim | ...................... E02F 9/2267 |
| 2013/0037131 | A1 | 2/2013 | Fujiwara et al. | |

(Continued)

FOREIGN PATENT DOCUMENTS

| | | |
|---|---|---|
| CN | 102859245 A | 1/2013 |
| JP | 2009-204086 A | 9/2009 |
| JP | 2009204086 A * | 9/2009 |

*Primary Examiner* — Minh Le
(74) *Attorney, Agent, or Firm* — Rabin & Berdo, P.C.

(57) ABSTRACT

A compensator spool of a load sensing valve device has a pressure chamber, a compensator throttle portion, a pressure introduction chamber, a pressure introduction port, a maximum load pressure introduction chamber, and a selector valve. A groove is formed around the pressure introduction port, and a groove moves relatively to a passage communicating with an actuator so as to reduce an area of an opening of the pressure introduction port when the compensator spool moves.

2 Claims, 3 Drawing Sheets

(56) References Cited

U.S. PATENT DOCUMENTS

| | | | | |
|---|---|---|---|---|
| 2014/0345268 A1* | 11/2014 | Jeon | ........................ | F15B 11/17 60/464 |
| 2015/0362087 A1* | 12/2015 | Coolidge | .............. | F15B 11/042 137/512 |
| 2016/0201297 A1* | 7/2016 | Jeon | .................... | F15B 13/0417 137/625.48 |
| 2016/0363140 A1* | 12/2016 | Mizukami | ............. | F15B 13/024 |
| 2017/0306989 A1* | 10/2017 | Coolidge | .............. | F15B 11/161 |

\* cited by examiner

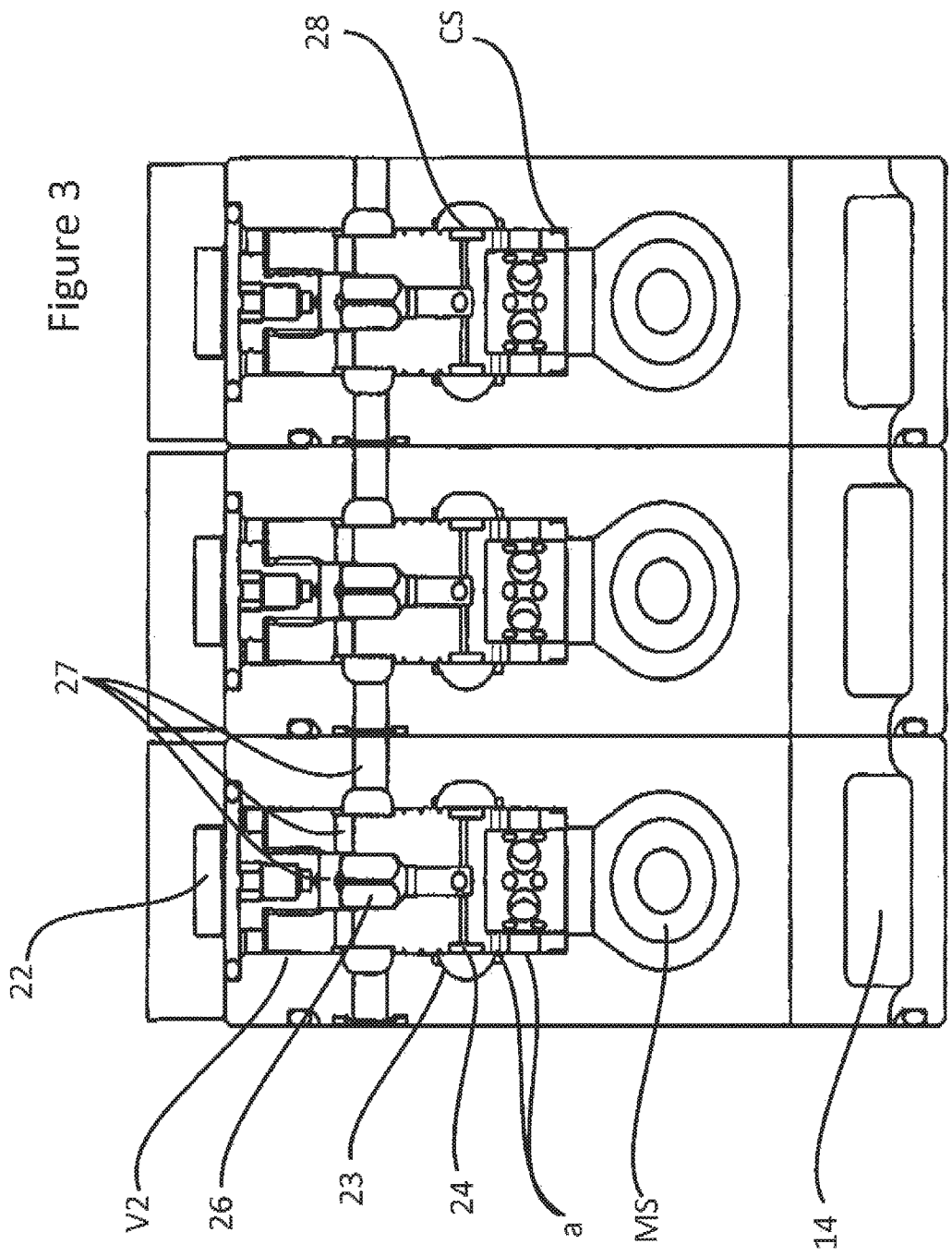

LOAD SENSING VALVE DEVICE

TECHNICAL FIELD

The present invention relates to a load sensing valve device.

BACKGROUND ART

JP2009-204086A discloses a load sensing valve device including a plurality of main valves and a plurality of compensator valves associated with each respective main valve.

The compensator valve is disposed in such a manner that an axis line thereof is at right angles to a spool of the main valve (hereinafter, called main spool).

The compensator valve disposes a variable throttle portion (hereinafter, called compensator throttle portion) in a passage course which is downstream of the main valve and which connects the main valve with an actuator port.

Moreover, a spool of the compensator valve (hereinafter, called compensator spool) has one end thereof facing a first pressure chamber and the other end thereof facing a second pressure chamber.

Furthermore, pressure of the upstream side of the compensator throttle portion is introduced into the first pressure chamber, and a maximum load pressure of actuators connected to the plurality of main valves is introduced into the second pressure chamber.

The compensator valve controls an opening of the compensator throttle portion in accordance with the pressures of the first pilot chamber and the second pilot chamber, and maintains a constant flow dividing ratio according to the openings of the main valves regardless of the variation in load pressure of the plurality of actuators.

Moreover, a selector valve is incorporated into the compensator spool. One end of the selector valve faces a maximum load pressure introduction chamber communicating with the second pressure chamber, and the other end thereof faces a load pressure introduction chamber formed in the compensator spool.

The load pressure introduction chamber communicates with an actuator port of the main valve with which the compensator valve is associated, via an introduction port formed in the compensator spool. However, the area of the opening of the introduction port is substantially constant, regardless of the moved position of the compensator spool.

The selector valve is configured to guide the pressure of the load pressure introduction chamber to the maximum load pressure introduction chamber, when the load pressure guided to the load pressure introduction chamber is higher than the pressure of the maximum load pressure introduction chamber.

Thereafter, a regulator of a pump operates in accordance with the maximum load pressure guided into the maximum load pressure introduction chamber, and a tilt angle of a variable displacement pump is controlled.

SUMMARY OF INVENTION

In the above load sensing valve device, a load pressure of the actuator is guided into the load pressure introduction chamber that the one end of the selector valve faces, via the pressure introduction port having a constant opening regardless of the moved position of the compensator spool.

At this time, for example, when a load pressure of one actuator changes from a relatively low state to the maximum load pressure, it is desirable to improve the responsiveness of the regulator and quickly control the tilt angle of the variable displacement pump in this initial stage. This is because if the control of the tilt angle of the variable displacement pump cannot keep up with the change in the maximum load pressure, it would not be possible to smoothly correspond to the change in the load pressure of the actuator.

However, if the responsiveness of the regulator is too good even after elapse of the initial stage of the load variation, a gain in the tilt angle change of the variable displacement pump becomes too large, which thus causes a problem that the movement of the actuator cannot be carried out smoothly as a whole.

Particularly, at the time of inching operation in a boom cylinder or arm cylinder of a construction machine, if the gain is too large, this would make the movement of the cylinders difficult to be carried out smoothly. Therefore, there has been the need to improve the responsiveness of the regulator in the initial stage of the load variation of the actuator, and to slightly drop the responsiveness after elapse of the initial stage.

The present invention has an object to provide a load sensing valve device capable of improving the responsiveness in tilt angle control of a variable displacement pump in an initial stage of load variation, and dropping the responsiveness after elapse of the initial stage.

According to one aspect of the present invention, a load sensing valve device includes a plurality of valve bodies associated with a plurality of actuators and having an actuator port for guiding working fluid to the plurality of actuators; a plurality of main spools incorporated in a slidable manner into respective ones of the plurality of valve bodies; and a plurality of compensator spools incorporated at right angles with respect to an axial direction of the plurality of main spools. The compensator spool comprises: a pressure chamber into which working fluid from a variable displacement pump is guided in accordance with a switching of the main spool; a compensator throttle portion configured to vary a communicating opening between the pressure chamber and the actuator port in accordance with a moved position of the compensator spool; a pressure introduction chamber disposed downstream of the pressure chamber so that load pressure of the actuator is guided; a pressure introduction port configured to communicate the pressure introduction chamber with the actuator port; a maximum load pressure introduction chamber to which a maximum load pressure is guided among load pressures of the plurality of actuators; and a selector valve of which one end faces the pressure introduction chamber and other end faces the maximum load pressure introduction chamber, the selector valve being configured to select a higher pressure between the pressure introduction chamber and the maximum load pressure introduction chamber. A groove is formed around the pressure introduction port, and the groove moves relatively to a passage communicating with the actuator so as to reduce an area of an opening of the pressure introduction port when the compensator spool moves.

BRIEF DESCRIPTION OF DRAWINGS

FIG. 3 is a cross-sectional right side view of the load sensing valve device.

DESCRIPTION OF EMBODIMENTS

Described below with reference to the attached drawings is a load sensing valve device 100 according to an embodiment of the present invention.

The load sensing valve device 100 is, for example, used in a construction machine having a plurality of actuators, in particular a power shovel, and is a device including a main valve that controls the plurality of actuators separately.

Figure 1:
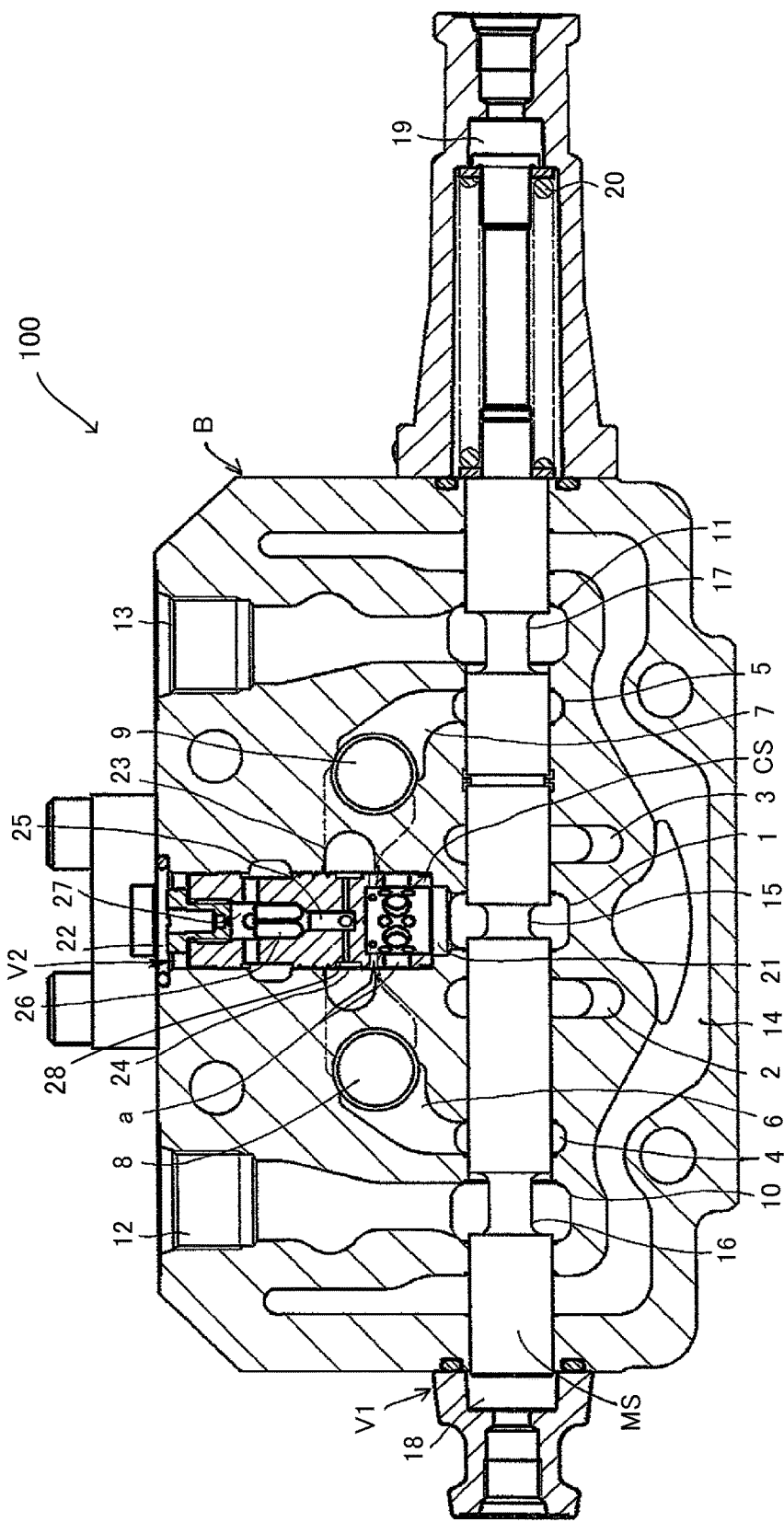
FIG. 1 is a cross-sectional view of a load sensing valve device according to an embodiment of the present invention.

As shown in FIG. 1, the load sensing valve device 100 includes a valve body B that incorporates a main valve V1 and a compensator valve V2. The valve body B configured as including the main valve V1 and the compensator valve V2 as one set as such is provided for each of the plurality of actuators (not illustrated). Moreover, these valve bodies B are usually formed into a manifold.

A main spool MS is disposed in a slidable manner in a spool hole of the valve body B. Moreover, a first annular recessed section 1 is formed on the circumference of the spool hole at a center position of the spool hole midway along an axis direction of the main spool MS.

A second annular recessed section 2 and a third annular recessed section 3 are formed on either side of the first annular recessed section 1, that is to say, at linear symmetrical positions with the first annular recessed section 1. The second annular recessed section 2 and the third annular recessed section 3 are each connected to a variable displacement pump (not illustrated), and working fluid discharged from the variable displacement pump is constantly guided therethrough. Passages connecting the second annular recessed section 2 and the third annular recessed section 3 with the variable displacement pump constitute an introduction passage.

A fourth annular recessed section 4 and a fifth annular recessed section 5 are formed on outer sides of the second annular recessed section 2 and the third annular recessed section 3 at positions symmetrical with the first annular recessed section 1. The fourth annular recessed section 4 and the fifth annular recessed section 5 constantly communicate with flow passages 6 and 7, respectively.

The flow passages 6 and 7 are provided with respective load check valves 8 and 9. The compensator valve V2 is incorporated in a flow course between the first annular recessed section 1 and the flow passages 6 and 7.

The load check valves 8 and 9 allow only the flow from the compensator valve V2 to the fourth annular recessed section 4 and the fifth annular recessed section 5.

A sixth annular recessed section 10 and a seventh annular recessed section 11 are formed on further outer sides of the fourth annular recessed section 4 and the fifth annular recessed section 5, at positions symmetrical with the first annular recessed section 1. The sixth annular recessed section 10 and the seventh annular recessed section 11 constantly communicate with actuator ports 12 and 13, respectively, which communicate with the actuator.

The valve body B is formed with a return passage 14 that communicates with a tank (not illustrated). Both end parts of the return passage 14 are positioned on outer sides of the sixth annular recessed section 10 and seventh annular recessed section 11.

A first annular groove 15 is formed on the center part of the main spool MS. The first annular groove 15 directly faces the first annular recessed section 1 when the main spool MS is in a neutral position as shown in FIG. 1. When the main spool MS switches from the neutral position to a position in either left or right thereof, the first annular recessed section 1 communicates with either one of the second annular recessed section 2 or third annular recessed section 3 on an advancing side in the switching direction, via the first annular groove 15.

When the first annular recessed section 1 communicates with either one of the second annular recessed section 2 and the third annular recessed section 3 via the first annular groove 15, this communicating part constitutes a main throttle portion.

The main throttle portion increases in its opening as the main spool MS moves in the switching direction, and the opening decreases as the main spool MS comes closer to the neutral position.

A second annular groove 16 and a third annular groove 17 are formed on either side of the main spool MS, that is to say, on symmetric positions with the first annular groove 15. The second annular groove 16 and the third annular groove 17 directly face the sixth annular recessed section 10 and the seventh annular recessed section 11, respectively, when the main spool MS is in the neutral position.

When the main spool MS, for example, switches by moving in the right direction in FIG. 1, the sixth annular recessed section 10 communicates with the fourth annular recessed section 4 via the second annular groove 16, and the seventh annular recessed section 11 communicates with the return passage 14 via the third annular groove 17.

Moreover, when the main spool MS switches by moving in the left direction in FIG. 1, the seventh annular recessed section 11 communicates with the fifth annular recessed section 5 via the third annular groove 17, and the sixth annular recessed section 10 communicates with the return passage 14 via the second annular groove 16.

Both ends of the main spool MS faces respective pilot chambers 18 and 19, and the main spool MS is usually maintained in the neutral position as shown in FIG. 1 by action of a spring force of a centering spring 20 disposed in the pilot chamber 19.

A compensator spool CS, which is a main element of the compensator valve V2, is disposed in a slidable manner in a spool hole in the valve body B formed orthogonally to the spool hole of the main spool MS.

The compensator spool CS has its axis line at right angles to the axis line of the main spool MS. Moreover, one end thereof faces a pressure chamber 21 that constantly communicates with the first annular recessed section 1, and the other end thereof faces a maximum load pressure introduction chamber 22.

Since the compensator spool CS is made at right angles to the axis line of the main spool MS as such, it is possible to use, for example, a body of a device disclosed in JP2009-204086A.

Moreover, a compensator throttle portion a is provided in the compensator spool CS. The compensator throttle portion a in the state of FIG. 1 is of a minimum opening with respect to an annular recessed section 23 that communicates the flow passages 6 and 7 with each other.

Figure 2:
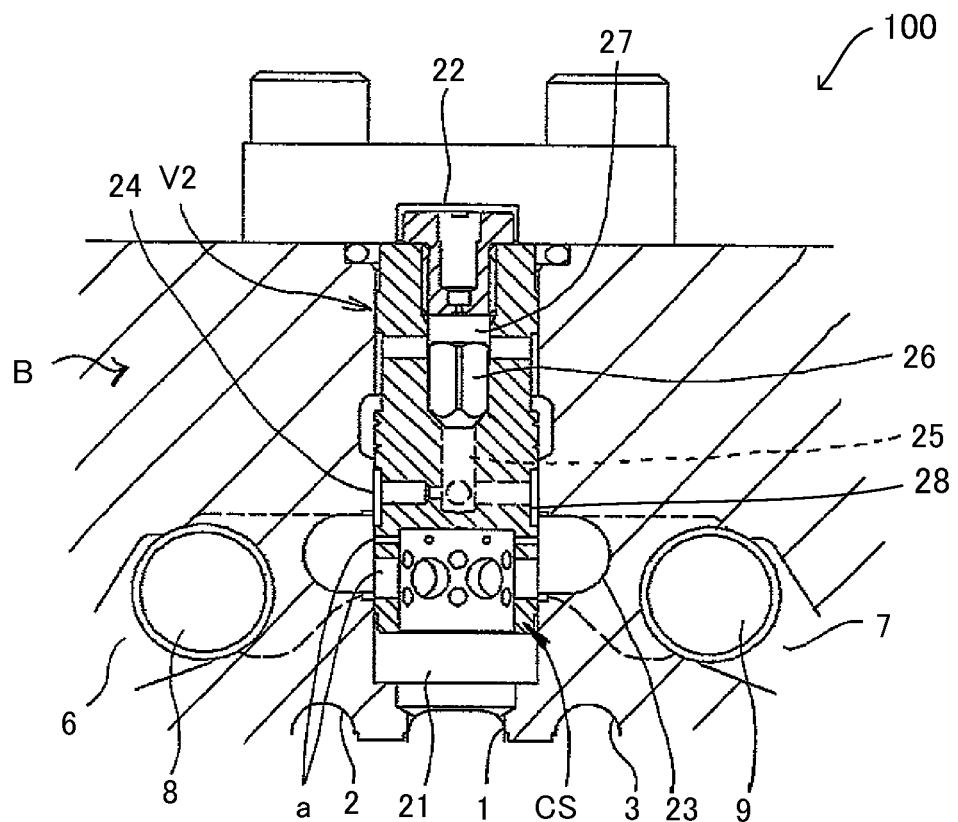
FIG. 2 is a view showing a state in which an opening of a compensator throttle portion of a compensator valve is maintained at its maximum state.

Furthermore, as the compensator spool CS moves towards the maximum load pressure introduction chamber 22, the opening of the compensator throttle portion a with respect to the recessed section 23 increases (see FIG. 2).

Moreover, the compensator spool CS has a pressure introduction port 24 whose opening with respect to the recessed section 23 varies in accordance with the moved position of the compensator spool CS. A groove 28 is formed around the opening of the pressure introduction port 24 on the recessed section 23 side of the compensator spool CS, and the substantial opening of the pressure introduction port 24 with respect to the recessed section 23 decreases in a course in which the groove 28 moves relatively with the recessed section 23.

The recessed section 23 is equivalent to a passage that communicates with the actuator side.

When the compensator spool CS is at the position shown in FIG. 1, the pressure introduction port 24 is in a fully-opened state with respect to the recessed section 23. Furthermore, in the course that the compensator spool CS moves in an upwards direction in FIG. 1, the opening with respect to the recessed section 23 decreases (see FIG. 2).

The pressure introduction port 24 communicates with a pressure introduction chamber 25 formed in the compensator spool CS. One end of a selector valve 26 faces the pressure introduction chamber 25. Moreover, the other end of the selector valve 26 faces a pressure relay chamber 27 that communicates with the maximum load pressure introduction chamber 22.

Therefore, pressure of the pressure introduction chamber 25, that is to say, a load pressure of an actuator connected to the main valve V1 and a maximum load pressure guided to the maximum load pressure introduction chamber 22, act on the selector valve 26.

When the load pressure of the actuator overcomes the pressure of the maximum load pressure introduction chamber 22 at this time, in other words, when the load pressure of the actuator is higher than the load pressure of the other actuators, the selector valve 26 opens due to the effect of the load pressure of the actuator, and the load pressure of the actuator is guided into the maximum load pressure introduction chamber 22.

When the load pressure of the actuator is lower than the pressure of the maximum load pressure introduction chamber 22, the selector valve 26 maintains its closed valve state by the effect of the pressure of the maximum load pressure introduction chamber 22.

As such, the maximum load pressure is selected among the load pressures of the actuators connected to the plurality of the main valves, and is introduced into the maximum load pressure introduction chamber 22 of each of the main valves and is guided to a tilt angle control section (not illustrated).

Next describes the effect of the present embodiment.

For example, when the main spool MS is switched from the neutral position shown in FIG. 1 to the right direction, the fourth annular recessed section 4 communicates with the sixth annular recessed section 10 via the second annular groove 16 of the main spool MS; accordingly, the actuator port 12 will communicate with the flow passage 6 of the main valve V1.

Moreover, the seventh annular recessed section 11 communicates with the return passage 14 via the third annular groove 17 of the main spool MS; this thus communicates the actuator port 13 with the return passage 14.

At this time, the first annular recessed section 1 communicates with the third annular recessed section 3 via the first annular groove 15 of the main spool MS, so the working fluid discharged from the variable displacement pump is guided to the pressure chamber 21 via the third annular recessed section 3 and the first annular recessed section 1. The pressure of the working fluid flowed into the pressure chamber 21 becomes lower in pump discharging pressure by the amount of pressure loss in accordance with the opening of the main throttle portion.

Moreover, the maximum load pressure of the actuators is introduced into the maximum load pressure introduction chamber 22. Hence, the pressure of the pressure chamber 21 acting on one end of the compensator spool CS and the maximum load pressure acting on the other end are applied against each other via the selector valve 26.

The opening of the compensator throttle portion a is determined based on the position of the compensator spool CS. The position of the compensator spool CS is determined based on a pressure balance between the pressure guided toward the pressure chamber 21 and a maximum load pressure guided to the maximum load pressure introduction chamber 22.

Moreover, the working fluid guided to the recessed section 23 pushes open the load check valve 8 and is guided to the actuator port 12, and is supplied from the actuator port 12 to the actuator.

Therefore, the pressure within the recessed section 23 becomes the load pressure of the actuator that is connected to the main valve V1.

The return fluid of the actuator is returned from the actuator port 13 to the return passage 14 through the third annular groove 17 of the main spool MS.

On the other hand, the pressure of the recessed section 23, that is to say, the load pressure of the actuator, is guided from the pressure introduction port 24 to the pressure introduction chamber 25. Therefore, when the maximum load pressure guided to the maximum load pressure introduction chamber 22 is higher upon comparison between the pressure of the pressure introduction chamber 25 and the maximum load pressure guided to the maximum load pressure introduction chamber 22, the selector valve 26 maintains a closed valve state, and the compensator spool CS maintains its current position, that is to say, the aforementioned balanced position.

Moreover, when the load pressure of the actuator connected to the main valve V1 increases in a state in which the main valve V1 is maintained in a predetermined switched position, the pressure of the pressure chamber 21 increases together with that increase.

At this time, the compensator spool CS moves in the upwards direction in FIG. 1 due to a pressure effect of the increased pressure chamber 21 and a pressure effect of the maximum load pressure guided to the maximum load pressure introduction chamber 22, and the opening of the compensator throttle portion a increases.

When the opening of the compensator throttle portion a increases, the pressure loss in the front and rear of the compensator throttle portion a decreases. Hence, the differential pressure in the front and rear of the main throttle portion is kept constant. When the differential pressure in the front and rear of the main throttle portion is kept constant, the amount of flow that passes through the main throttle portion will not change even if the load pressure of the actuator increases. In other words, the flow dividing ratio according to the opening of the plurality of main valves will be kept constant regardless of the load pressure of the actuator connected to each of the main valves.

Moreover, when the load pressure of the actuator connected to the main valve V1 decreases in a state in which the main valve V1 is maintained in the predetermined switching position, the pressure of the pressure chamber 21 also decreases.

At this time, the compensator spool CS moves in a downwards direction in FIG. 1 due to a pressure effect of the decreased pressure chamber 21 and a pressure effect of the maximum load pressure guided to the maximum load pressure introduction chamber 22, and the opening of the compensator constricted part a decreases.

When the opening of the compensator constricted part a decreases, the pressure loss in the front and rear of the compensator throttle portion a increases. Hence, the differential pressure in the front and rear of the main throttle portion is kept constant. If the differential pressure in the front and rear of the main throttle portion is kept constant, the amount of flow passing through the main throttle portion will not change, and the flow dividing ratio in accordance with the opening of the plurality of the main valves is kept constant as described above, regardless of the load pressure of the actuator connected to the main valves.

The maximum load pressure guided to the maximum load pressure introduction chamber 22 is guided to the tilt angle control section, and the variable displacement pump is controlled by the tilt angle control section to a tilt angle in accordance with the maximum load pressure.

Moreover, in the pressure introduction port 24 of the present embodiment, the opening with respect to the recessed section 23 changes in accordance with a moved position of the compensator spool CS.

When the compensator spool CS is in the state in FIG. 1, the compensator spool CS is in full-stroke towards the pressure chamber 21. Thus, the load pressure of the actuator connected to the main valve V1 is lower than the load pressure of the other actuators.

When the load pressure of the actuator increases from this state and the pressure of the pressure chamber 21 overwhelms the maximum load pressure guided to the maximum load pressure introduction chamber 22, the compensator spool CS moves in an upper direction in FIG. 1.

As such, in an initial stage of the movement of the compensator spool CS, the pressure introduction port 24 is opened to its maximum. Therefore, in the initial stage where the maximum load pressure is reversed, the tilt angle control section responses rapidly.

Thereafter, when the compensator spool CS moves by a predetermined amount, the opening of the pressure introduction port 24 decreases with respect to the recessed section 23. That is to say, the area of the opening decreases in the course of the compensator spool CS moving towards the maximum load pressure introduction chamber, which thus decreases the gain of the tilt angle control by the tilt angle control section, and hence allows for stable control by that amount.

As described above, according to the present embodiment, the opening of the pressure introduction port 24 is relatively large in the initial stage of the variation in the maximum load pressure, that is to say, in the initial stage that the compensator spool CS moves towards the maximum load pressure introduction chamber 22, and the opening of the pressure introduction port 24 decreases as the compensator spool CS moves towards the maximum load pressure introduction chamber 22. Therefore, the responsiveness with respect to the tilt angle control section of the variable displacement pump in the initial stage of variation in maximum load pressure improves, and this responsiveness can be dropped thereafter.

Moreover, in the present embodiment, the responsiveness can be varied with respect to the tilt angle control section in the moving course of the compensator spool CS. Therefore, for example, when an actuator with large load such as a boom cylinder or arm cylinder in a construction machine is inching controlled, these controls can be carried out smoothly.

The embodiments of the present invention described above are merely illustration of some application examples of the present invention and not of the nature to limit the technical scope of the present invention to the specific constructions of the above embodiments.

For example in the present embodiment, the groove 28 is formed around the pressure introduction port 24, to reduce the size of the substantial opening with respect to the recessed section 23 of the pressure introduction port 24 in the course that the groove 28 moves relatively with the recessed section 23. However, a plurality of small holes may be formed instead of the groove 28, and the opening of the pressure introduction port 24 may be reduced in accordance with the total opening of these small holes.

The present application claims a priority based on Japanese Patent Application No. 2014-218498 filed with the Japan Patent Office on Oct. 27, 2014, all the contents of which are hereby incorporated by reference.

The invention claimed is:

1. A load sensing valve device, comprising:
a plurality of valve bodies associated with a plurality of actuators and having an actuator port for guiding working fluid to the plurality of actuators;
a plurality of main spools incorporated in a slidable manner into respective ones of the plurality of valve bodies; and
a plurality of compensator spools incorporated at right angles with respect to an axial direction of the plurality of main spools,
wherein the compensator spool comprises:
a pressure chamber into which working fluid from a variable displacement pump is guided in accordance with a switching of the main spool;
a compensator throttle portion configured to vary a communicating opening between the pressure chamber and the actuator port in accordance with a moved position of the compensator spool;
a pressure introduction chamber disposed downstream of the pressure chamber so that load pressure of the actuator is guided;
a pressure introduction port configured to communicate the pressure introduction chamber with the actuator port;
a maximum load pressure introduction chamber to which a maximum load pressure is guided among load pressures of the plurality of actuators; and
a selector valve of which one end faces the pressure introduction chamber and other end faces the maximum load pressure introduction chamber, the selector valve being configured to select a higher pressure between the pressure introduction chamber and the maximum load pressure introduction chamber, and
wherein a groove is formed around the pressure introduction port, and the groove moves relatively to a passage communicating with the actuator so as to reduce an area of an opening of the pressure introduction port when the compensator spool moves.

2. A compensator spool for a load sensing valve device, comprising:
a pressure chamber into which working fluid from a variable displacement pump is guided in accordance with a switching of a main spool of the load sensing valve device;
a compensator throttle portion configured to vary a communicating opening between the pressure chamber and an actuator port of the load sensing valve device, in accordance with a moved position of the compensator spool;
a pressure introduction chamber disposed downstream of the pressure chamber so that load pressure of an actuator of a plurality of actuators associated with the load sensing valve device is guided;

a pressure introduction port configured to communicate the pressure introduction chamber with the actuator port;

a maximum load pressure introduction chamber to which a maximum load pressure is guided among load pressures of the plurality of actuators; and a selector valve of which one end faces the pressure introduction chamber and another end faces the maximum load pressure introduction chamber, the selector valve being configured to select a higher pressure between the pressure introduction chamber and the maximum load pressure introduction chamber, and wherein a groove is formed around the pressure introduction port, and the groove moves relatively to a passage communicating with the actuator so as to reduce an area of an opening of the pressure introduction port when the compensator spool moves.

* * * * *